Figure 1:
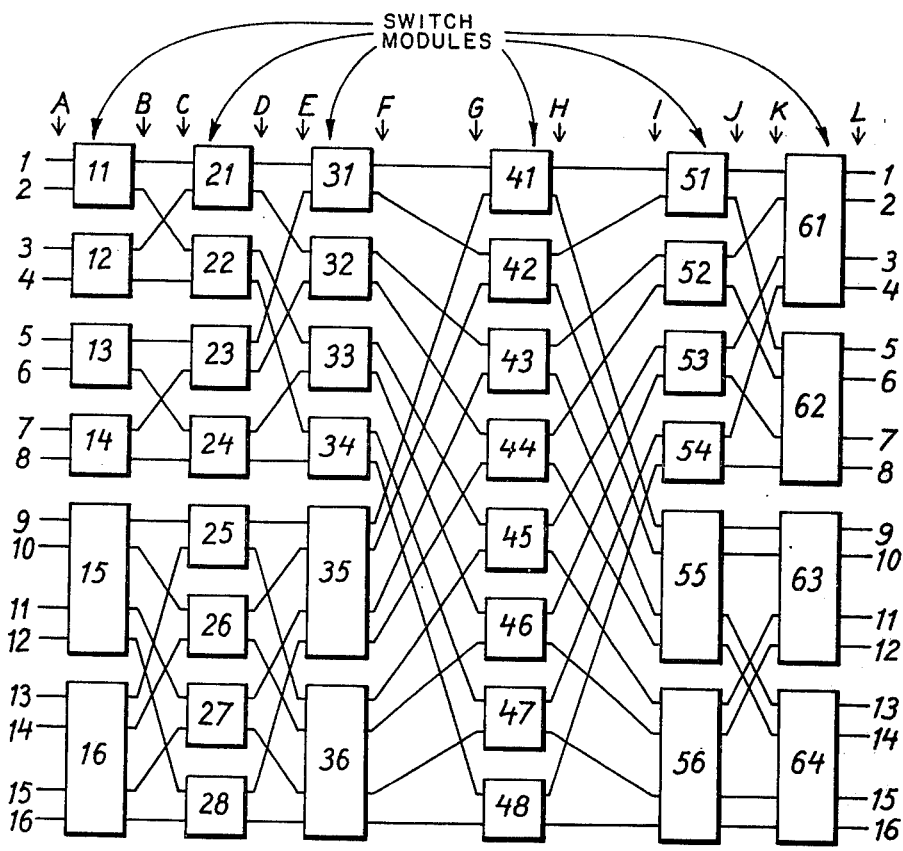

United States Patent [19]

Hemdal

[11] 4,022,982
[45] May 10, 1977

[54] APPARATUS FOR REARRANGEMENT OF A SWITCHING NETWORK

[75] Inventor: Göran Anders Henrik Hemdal, Skarholmen, Sweden

[73] Assignee: Telefonaktiebolaget L M Ericsson, Stockholm, Sweden

[22] Filed: Dec. 4, 1975

[21] Appl. No.: 637,835

[30] Foreign Application Priority Data

Dec. 20, 1974 Sweden .............................. 7416098

[52] U.S. Cl. ...................... 179/15 AT; 179/18 EA
[51] Int. Cl.² ...................................... H04Q 11/04
[58] Field of Search ...... 179/15 AT, 18 EA, 18 ES, 179/18 FF, 18 FG, 18 GE, 18 GF, 18 G, 18 C

[56] References Cited

UNITED STATES PATENTS

| | | | |
|---|---|---|---|
| 3,462,743 | 8/1969 | Milewski | 340/172.5 |
| 3,511,937 | 5/1970 | Bastian | 179/18 GE |
| 3,638,193 | 1/1972 | Opferman | 179/18 GF |
| 3,916,124 | 10/1975 | Joel | 179/18 EA |

*Primary Examiner*—David L. Stewart
*Attorney, Agent, or Firm*—Hane, Sullivan & Spiecens

[57] ABSTRACT

Apparatus establishes a connection between a certain network input or input channel and a certain network output or output channel by rearrangement of a three-stage switching network, where, in a specific network condition, each network input or input channel is assigned to a specific network output or output channel. The desired connection is derived by means of successive permutations of the connections within the switching stages until the desired connection has been attained.

The apparatus includes a special switching memory wherein the actual network condition is recorded. The organization of the memory is such that the various memory cells are addressed according to the numbering of the interstage links on one side of the central switching stage and each of the cells has a record of which network input and network output is interconnected via the link in question. The apparatus further includes means for the identification of the addresses involved in the desired connection and for the subsequent determination and execution of the necessary permutations, based on these addresses.

4 Claims, 8 Drawing Figures

Fig. 6

SWITCH MEMORY KM

| | IR | | UR | |
|---|---|---|---|---|
| | IRa | IRb | URa | URb |
| 0 | 0 | 0 | 2 | 0 |
| 1 | 1 | 2 | 0 | 4 |
| 2 | 2 | 4 | 1 | 4 |
| 3 | 0 | 1 | 2 | 4 |
| 4 | 1 | 3 | 1 | 2 |
| 5 | 2 | 2 | 0 | 2 |
| 6 | 0 | 2 | 0 | 3 |
| 7 | 1 | 4 | 1 | 3 |
| 8 | 2 | 0 | 2 | 1 |
| 9 | 0 | 3 | 0 | 1 |
| 10 | 1 | 1 | 1 | 1 |
| 11 | 2 | 1 | 2 | 3 |
| 12 | 0 | 4 | 1 | 0 |
| 13 | 1 | 0 | 0 | 0 |
| 14 | 2 | 3 | 2 | 2 |

Fig. 7

SWITCH MEMORY KM

| | IR | | UR | |
|---|---|---|---|---|
| | IRa | IRb | URa | URb |
| 0 | 0 | 0 | 1 | 4 |
| 1 | 1 | 2 | 0 | 4 |
| 2 | 2 | 4 | 2 | 0 |
| 3 | 0 | 1 | 2 | 4 |

APPARATUS FOR REARRANGEMENT OF A SWITCHING NETWORK

The present invention concerns an apparatus for the establishment of a connection between a certain network input or input channel and a certain network output or output channel by rearrangement of a switching network which is composed of three link-connected switching stages, each comprising at least two switching modules, where, in a specific network condition, each network input or input channel is assigned to a specific network output or output channel. More specifically, the apparatus includes a control unit and control devices associated with the respective switching modules which establish connection between module inputs and module outputs, the desired connection between a certain network input or input channel and a certain network output or output channel being derived by means of successive permutations of connections within individual switching modules until the desired connection has been attained.

Large switches are normally constructed as networks comprising a number of switching stages connected by links. In a conventional switching network a connecting process is initiated by random or orderly selection of a link constituted by a physical line pair or a time slot in a channel and then an investigation is made of whether the chosen link provides a connection through the switching network. If the result is negative an alternative link is chosen and a new investigation is made. If, after repeated attempts, no connection has been attained the switching network is said to be congested. In order to keep the congestion probability at a low level the number of links must be large, which means that the links have a low utilization factor.

The advent of electronic switching networks, however, makes it possible to reduce the number of links and at the same time to eliminate all congestion by means of so called rearrangement. Rearrangement means that one or more of the existing connections in the network are rerouted in such a way that those links which are needed to set up a new connection are made free. In an electronic switching network the rearrangement can be performed so fast that it does not interfere with the rerouted connections and therefore it is obvious that the network can be constructed in such a way that all new connections are set up by means of rearrangement. The network is then provided with the same number of links or time slots between each two switching stages, the number corresponding to the number of network inputs and network outputs, in order that each of the network inputs can always be assigned to a network output and new connections can be established by exchanging the involved inputs or outputs. At best, the rearrangement will affect a single stage but more frequently it will affect more stages.

In order to make the rearrangement principle feasible it is necessary that the processing of the required reroutings in the various stages can be made sufficiently fast. However, this condition is not fulfilled by the methods presently known. In the article "On a Class of Rearrangeable Switching Networks", The Bell System Technical Journal, Volume 50, No. 5, May-June 1971, a method is described which is based on the recording in a memory of the sequence numbers assigned to the network outputs on memory addresses corresponding to the sequence numbers of the corresponding inputs. From this recording, which expresses the existing network condition or, to use a different expression, the overall permutation for the complete switch, the subpermutations for the various switching stages are calculated. These subpermutations describe the interconnections between the inputs and the outputs of the selector stages. In the article a number of methods are described for establishing these subpermutations, each of the methods being suitable for a certain network size. Various subpermutations are tested in an iterative manner until one is found that meets the desired overall permutation, a procedure which becomes extremely cumbersome and time consuming for large switching networks, greatly due to the fact that the one and the same overall permutations can be met by a large number of combinations of subpermutations.

It is an object of the present invention to enable a fast determination of the necessary permutation changes in a rearrangeable switching network, starting from an overall permutation describing the existing network condition. For this purpose, according to the invention, a special switch memory is utilized for storing the overall permutations. The organization of the switch memory is such that the various memory cells are addressed according to the numbering of the links associated with a switching stage which is centrally situated in the switching network, each memory cell having a record of which network input and network output is interconnected via the link in question. The characteristics of the invention will appear from the claims.

The invention will be described by the aid of an embodiment which concerns a switching network where the links are constituted of physical wires, but it is evident that the same principle is applicable even when the links are realized in the form of time slots in TDM-frames.

Figure 2:
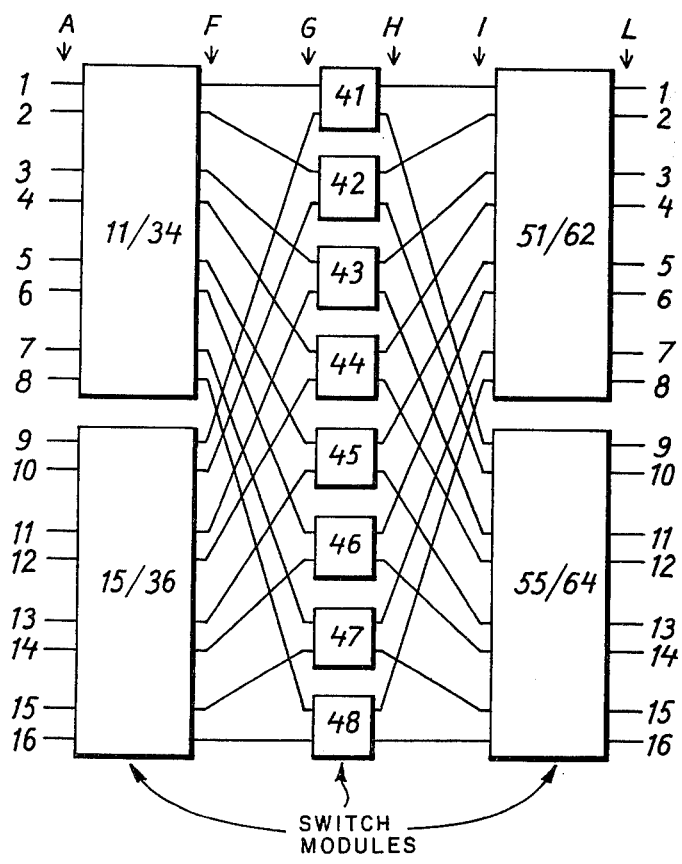
Figure 3:
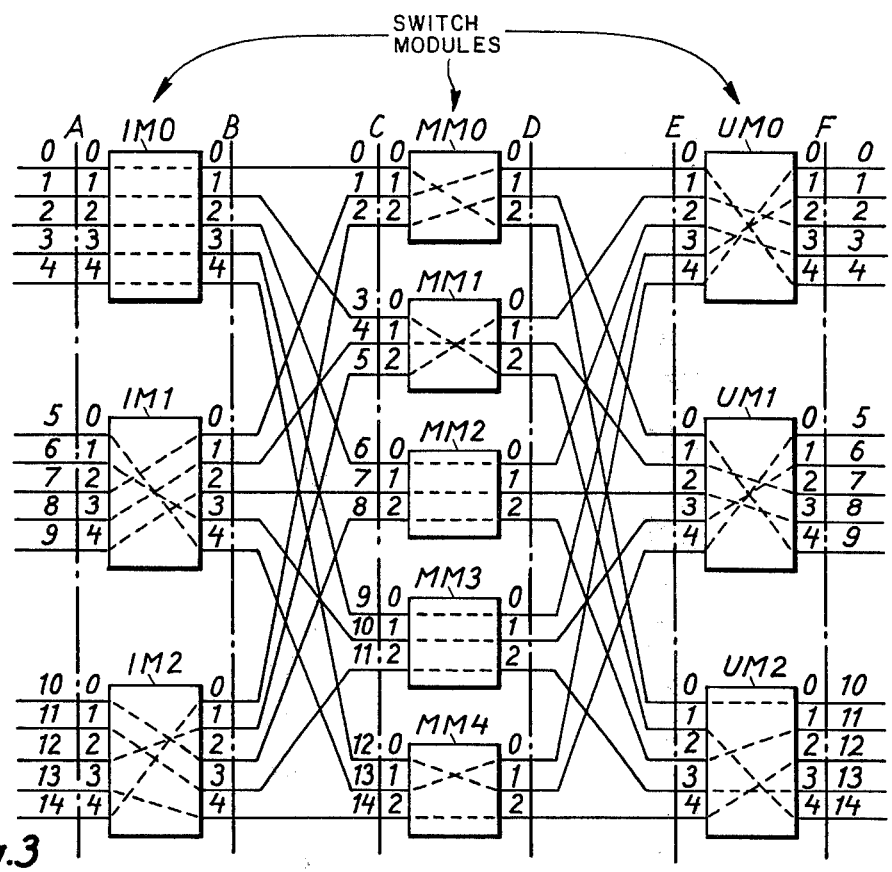
Figure 4:
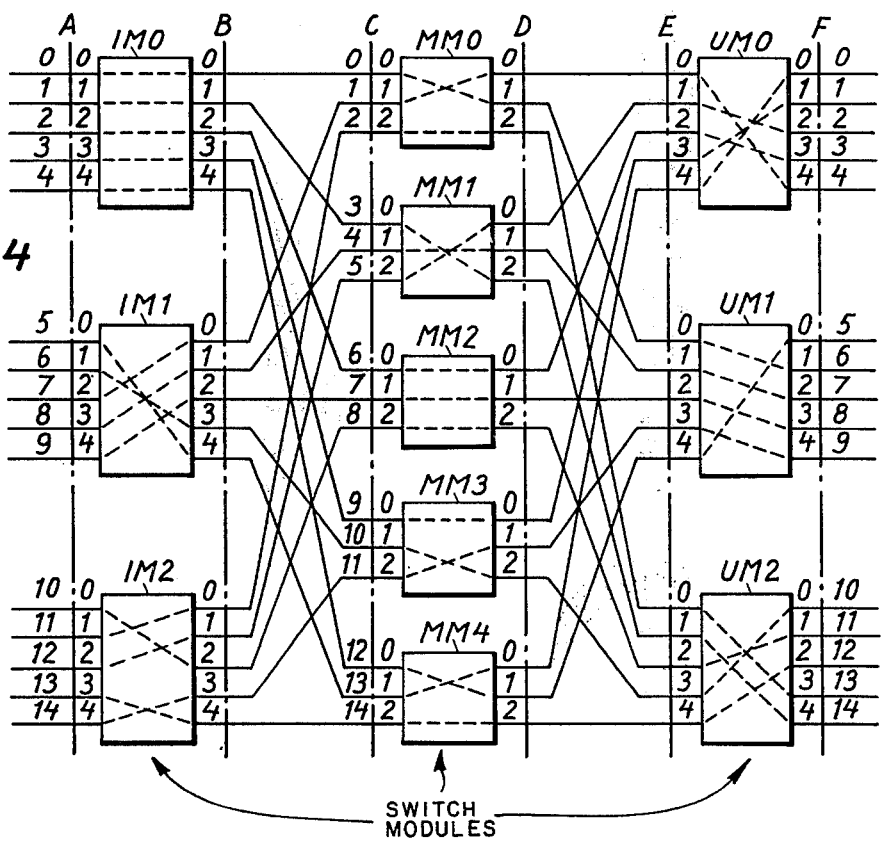
Figure 5:
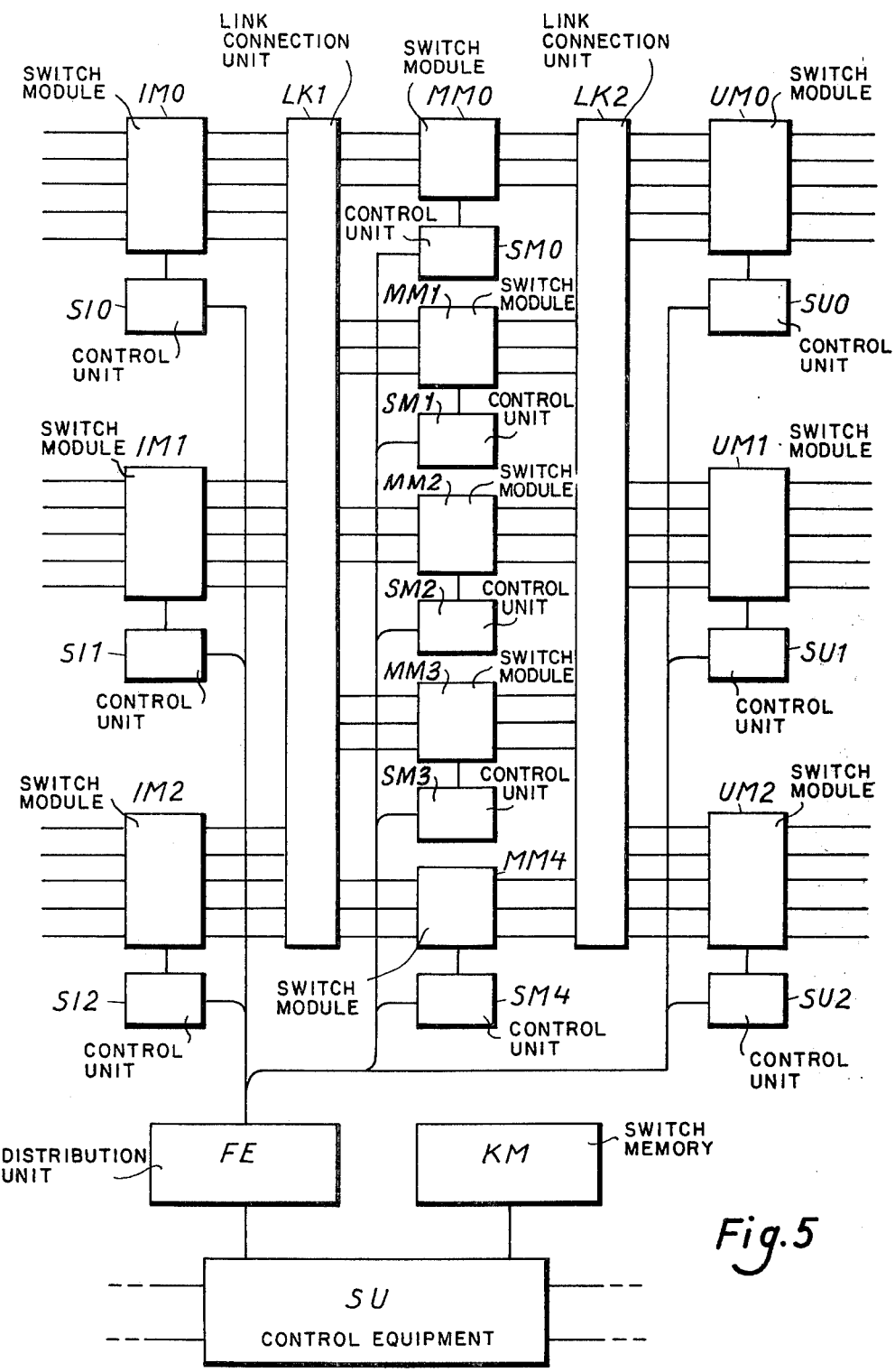
Figure 8:
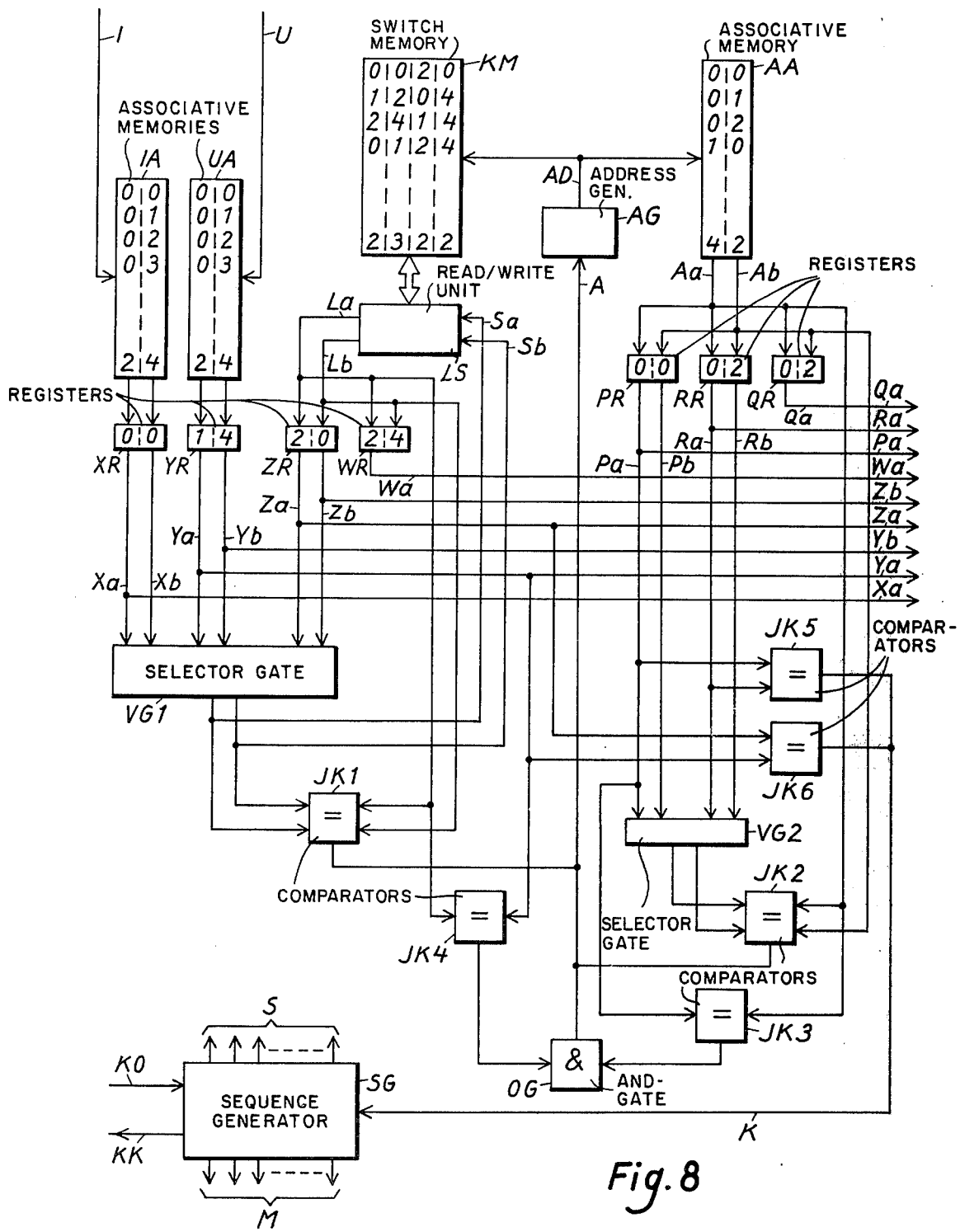

FIG. 1 shows, in schematic form, a 6-stage switching network with 16 inputs and 16 outputs, FIG. 2 a 3-stage switching network which, from the interface point of view, is equivalent with the switching network of FIG. 1, whereas FIGS. 3 and 4 shows a 3-stage switching network with 15 inputs at two different network conditions. FIG. 5 is a block schematic which illustrates the structure of the switching network according to FIGS. 3 and 4 including the associated control equipment, while FIGS. 6 and 7 show the organization of a special switch memory, connected to the control equipment and arranged in accordance with the invention. FIG. 8 shows an example of how the control equipment can be realized.

The switching network of FIG. 1 is composed of a large number of switching modules with 2 inputs and 2 outputs and a few modules with 4 inputs and outputs. The general principle is that each input can be connected to any of the outputs in the same module. Each module has been assigned a two-digit number where the first digit defines the switching stage in which it is included while the second digit defines the sequence number of the module within a switching stage, the numbers running from the top. The inputs and outputs of each switching stage are designated by a letter A – L and for each of those inputs and outputs the numbering 1 – 16 shown on both sides of the network applies. The shown switching network is intended to demonstrate how a switching network may be constructed, in principle, to provide full access to all of the outputs from each of the inputs. Therefore, the network is not homogeneous, but sections of the network, corresponding to each other, have been constructed in different ways to show a number of integral structures which more or a less can replace each other. For comparison, one can look at the network shown in FIG. 2, which is a 3-stage switching network which, from the interface point of view, is equivalent to the 6-stage network of FIG. 1. The letter and number designations for the inputs and the outputs in both figures correspond to each other and the same applies to the numbering of the switching modules 41 – 48. Schematically, the switching module 11/34 of FIG. 2 corresponds to the modules 11 – 14, 21 – 24 and 31 – 34 of FIG. 1; module 15/36 corresponds to 15 – 16, 25 – 28 and 35 – 36; 51/62 corresponds to modules 51 – 54 and 61 – 62; module 55/64 corresponds to modules 55 – 56 and 63 – 64. Functionally, modules 11/34 and 15/36 are mirrors of modules 51/62 and 55/64, respectively, and therefore the network of FIG. 2 is fully symmetrical. The only one of the mentioned four switching modules which, functionally, has its full correspondence in FIG. 1 is the module 15/36. The others have their correspondence only with some limitations regarding the possibility to combine inputs and outputs within the network portion in question. While the three switching stages between the inputs A 9–16 and the outputs F 9–16 of FIG. 1 thus provide the same free choice as applies to the module 15/36 of FIG. 2 there exists a considerable internal congestion in the network portion formed by the three switching stages between the inputs A 1–8 and the outputs F 1–8 of FIG. 1. The reason for the congestion is that the network portion is not rearrangeable, i.e. there is only one possible route for each desired connection between an input in the A-interface and an output in the F-interface. If for instance the input A 1 is connected to the output F3 the input A 2 cannot at the same time be connected to output F 1, F 2, or F 4, neither can A 3 or A 4 be connected to F 4. As regards the network portion between the inputs I 1–8 and the outputs L 1–8 of FIG. 1 the congestion is somewhat lower due to the introduction of a stage with 4 × 4 modules (4 inputs, 4 outputs) instead of two stages with 2 × 2 modules, e.g. the module 61 instead of the modules 11 – 12 and 21 – 22. Also here, however, there is only one possible route between each input and output. A still lower degree of congestion exists in the portion between inputs I 9–16 and outputs L 9–16 as 4 × 4 modules have been introduced in both switching stages. But once again the network portion is not rearrangeable. In spite of the limitations mentioned above for the network portions, the switching network as a whole is rearrangeable since each of the inputs can be connected to any of the outputs via any of the switching modules 41 – 48 in the center stage, i.e. there is more than one possible route. It is therefore feasible to let FIG. 2 represent the switching network of FIG. 1 schematically, the switching stages between the A and the F interfaces forming substages of the switching stages 11/34 and 15/36 and the switching stages between the I and the L interfaces forming substages of the switching stages 15/62 and 55/64. In this manner it is possible to simplify the calculations of the necessary permutations in order to attain the desired rearrangement. After having thus performed the calculation on a 3-stage network one can proceed by investigating the necessary reroutings within the substages. As concerns the three substages between inputs A 9–16 of FIG. 1 they are fully rearrangeable and therefore a corresponding calculation of the permutations can be made for these stages. For the other substages it is only necessary to check that the respective reroutings can be made considering the actual congestion probability. If the required rerouting cannot be made an alternative permutation of the 3-stage network is made etc.

According to the above, the problem of calculating the permutations for an arbitrary switching network can be limited by reducing the switching network to a 3-stage network, where each of the switching stages can comprise one or more substages, each of which in turn forming sub networks which may also be rearrangeable. FIG. 3 shows an example of such a 3-stage network. The network has 15 inputs and 15 outputs divided between 3 input modules IM O – IM 2 and 3 output modules UM O – UM 2. The center stage comprises 5 center modules MM O – MM 4 which can be reached by all of the modules in the input and the output stages via 15 links each. The input and output sides of the three stages have been designated with the letters A – F and for each of the sides two numbering systems are applied, a internal system and an external system. According to the external numbering system all stage inputs or stage outputs at the same border line, e.g. the line A, are numbered in a sequence from 0 to 14. According to the internal numbering system the numbering is individual to each of the switching modules. For the input and the output modules the numbers run from 0 to 4 and for the center modules from 0 to 2. The network condition can be described by means of a so called overall permutation which is a listing of the interconnected network inputs and network outputs. If the elements of the overall permutation are listed in the straight forward sequence which is determined by the external numbering system at the A border line according to the routing example of FIG. 3 the following set will be derived:

$$P(A) = \begin{pmatrix} 0 & 1 & 2 & 3 & 4 & 5 & 6 & 7 & 8 & 9 & 10 & 11 & 12 & 13 & 14 \\ 10 & 14 & 3 & 1 & 5 & 0 & 6 & 4 & 7 & 8 & 11 & 13 & 2 & 12 & 9 \end{pmatrix}$$

As an alternative it may seem natural to start from the F border line, the set derived being:

$$P(F) = \begin{pmatrix} 5 & 3 & 12 & 2 & 7 & 4 & 6 & 8 & 9 & 14 & 0 & 10 & 13 & 11 & 1 \\ 0 & 1 & 2 & 3 & 4 & 5 & 6 & 7 & 8 & 9 & 10 & 11 & 12 & 13 & 14 \end{pmatrix}$$

According to the previously cited known method for calcuation of the necessary reroutings one starts from either of the above permutations. The common thing about them is that they can be satisfied by a great many subpermutations for the three switching stages and therefore the given overall permutations are not unambiguous. According to the invention, however, provisions have been made for recording the overall permutations in relation to a central border line, e.g. the C line. This means that the elements of the permutation are listed in a sequence determine by the sequence which applies to the corresponding routes across this border line, i.e. according to the sequence numbers of the links.

$$P(C) = \begin{pmatrix} 0\ 7\ 14 & 1\ 8\ 12 & 2\ 9\ 10 & 3\ 6\ 11 & 4\ 5\ 13 \\ 10\ 4 & 9\ 14\ 7 & 2\ 3\ 8 & 11\ 1\ 6 & 13\ 5\ 0\ 12 \end{pmatrix}$$

The advantage of this overall permutation, in comparison with the two earlier ones, is that it defines the subpermutations of all switching stages unambiguously. The reason for this is that from each stage input at the C border line there is only one route to a definite network input at the A line and only one route to a definite network output at the F line. The same advantage is attained also with overall permutations relating to the B, D, or E border lines.

When determining the subpermutations for the various switching modules in the network it is more advantageous to designate the network inputs and outputs in accordance with the internal numbering system. Each element in the overall permutation is then transformed into a 2-digit number, the first digit signifying the sequence number of the module through which the input or output in question is connected and the second digit signifying the internal numbering within the module. The network input number 6, for instance, is connected to the input module IM 1 and there it has the internal number 1. Consequently it is designated by the number 11. According to the above overall permutation at the C border line will be as follows.

$$P(C) = \begin{pmatrix} 00\ 12\ 24 & 01\ 13\ 22 & 02\ 14\ 20 & 03\ 11\ 21 & 04\ 10\ 23 \\ 20\ 04\ 14 & 24\ 12\ 02 & 03\ 13\ 21 & 01\ 11\ 23 & 10\ 00\ 22 \end{pmatrix}$$

For greater clarity the elements are rearranged into groups of three and in rows according to the first digit of each element.

$$P(C) = \begin{pmatrix} 00 & 01 & 02 & 03 & 04 \\ 12 & 13 & 14 & 11 & 10 \\ 24 & 22 & 20 & 21 & 23 \\ \hline 04 & 02 & 03 & 01 & 00 \\ 14 & 12 & 13 & 11 & 10 \\ 20 & 24 & 21 & 23 & 22 \end{pmatrix} \begin{matrix} (\text{IM}\ 0) \\ (\text{IM}\ 1) \\ (\text{IM}\ 2) \\ (\text{UM}\ 0) \\ (\text{UM}\ 1) \\ (\text{UM}\ 2) \end{matrix}$$

(MM 0)(MM 1)(MM 2)(MM 3)(MM 4)

By taking the last digit of all elements on the same horizontal line one can derive the subpermutation for that input or output module which is indicated within brackets on the same line to the right of the overall permutation. The digits then designate the internal numbering at the A or the F border line. The corresponding numbering at the B or the E border line will be consecutive in accordance with the sequence of elements from the left to the right. According to this rule subpermutations of the input modules will be:

$$P_0(B) = \begin{pmatrix} 0\ 1\ 2\ 3\ 4 \\ 0\ 1\ 2\ 3\ 4 \end{pmatrix}$$

$$P_1(B) = \begin{pmatrix} 2\ 3\ 4\ 1\ 0 \\ 0\ 1\ 2\ 3\ 4 \end{pmatrix}$$

$$P_2(B) = \begin{pmatrix} 4\ 2\ 0\ 1\ 3 \\ 0\ 1\ 2\ 3\ 4 \end{pmatrix}$$

As can be seen, the subpermutations are arranged in accordance with the numbering at the B border line. In the corresponding manner the subpermutations of the output modules will be:

$$P_0(E) = \begin{pmatrix} 0\ 1\ 2\ 3\ 4 \\ 4\ 2\ 3\ 1\ 0 \end{pmatrix}$$

$$P_1(E) = \begin{pmatrix} 0\ 1\ 2\ 3\ 4 \\ 4\ 2\ 3\ 1\ 0 \end{pmatrix}$$

$$P_2(E) = \begin{pmatrix} 0\ 1\ 2\ 3\ 4 \\ 0\ 4\ 1\ 3\ 2 \end{pmatrix}$$

By taking the first digit of all elements within the corresponding groups of three, one derives the subpermutation for that center module which is indicated within brackets below the respective group:

$$P_0(C) = \begin{pmatrix} 0\ 1\ 2 \\ 2\ 0\ 1 \end{pmatrix}$$

$$P_1(C) = \begin{pmatrix} 0\ 1\ 2 \\ 2\ 1\ 0 \end{pmatrix}$$

$$P_2(C) = \begin{pmatrix} 0\ 1\ 2 \\ 0\ 1\ 2 \end{pmatrix}$$

$$P_3(C) = \begin{pmatrix} 0\ 1\ 2 \\ 0\ 1\ 2 \end{pmatrix}$$

$$P_4(C) = \begin{pmatrix} 0\ 1\ 2 \\ 1\ 0\ 2 \end{pmatrix}$$

Assume that one wishes to interconnect the network input 0 with the network output 6. From the current overall permutation one finds that input 0 is, at present, interconnected with output 10 and output 6 with input 6. To execute the desired connection 0 – 6, one must thus at the same time interconnect network input 6 with network output 10. The new overall permutation will then have the following appearance:

$$P'(C) = \begin{pmatrix} 0\ 7\ 14 & 1\ 8\ 12 & 2\ 9\ 10\ 3 & 6\ 11\ 4\ 5\ 13 \\ 6\ 4 & 9\ 14\ 7 & 2\ 3\ 8\ 11\ 1 & 10\ 13\ 5\ 0\ 12 \end{pmatrix}$$

After transformation and regrouping of the elements in accordance with the previously described pattern one obtains:

$$P'(C) = \begin{pmatrix} 00 & 01 & 02 & 03 & 04 \\ 12 & 13 & 14 & 11 & 10 \\ 24 & 22 & 20 & 21 & 23 \\ 04 & 02\ 03 & 01 & 00 \\ 11\ 14 & 12 & 13 & 10 \\ 24 & 21 & 20\ 23 & 22 \end{pmatrix}$$

Here one can immediately see that non-permitted element combinations have emerged in two of the groups, since in each of the groups there are two elements (underlined) where the first digit is identical. Without changing the overall permutation as seen from the A border line one can, however, let the corresponding pairs of elements change places, i.e. both those of the input side and those of the output side. A change of this kind, which directly leads to a correct result, is that the pair 24/14 changes places with the pair 21/23.

$$P''(C) = \begin{pmatrix} 00 & 01 & 02 & 03 & 04 \\ 12 & 13 & 14 & 11 & 10 \\ 21 & 22 & 20 & 24 & 23 \\ 04 & 0203 & 01 & & 00 \\ 11 & 2412 & 13 & & 1410 \\ 23 & & 21 & 20 & 22 \end{pmatrix}$$

Sometimes it is not sufficient to make a single change of pairs to attain a correct result. If, for instance, one would have chosen to change the pair 00/11 and 03/01 a new non-permitted combination would have arisen, but by subsequently changing the pair 12/04 for 11/20 an acceptable permutation would have been derived. In addition to these changes, which are made in order to correct an invalid permutation, other permitted changes of pairs can of course be made, a great number of overall permutations being created at the border line C which all fulfil the overall permutation at the line A or F. From P ''(C) the new subpermutations are derived in the same way as before.

$$P_0''(B) = \begin{pmatrix} 0\,1\,2\,3\,4 \\ 0\,1\,2\,3\,4 \end{pmatrix} \quad P_0''(C) = \begin{pmatrix} 0\,1\,2 \\ 1\,0\,2 \end{pmatrix}$$

$$P_1''(B) = \begin{pmatrix} 2\,3\,4\,1\,0 \\ 0\,1\,2\,3\,4 \end{pmatrix} \quad P_1''(C) = \begin{pmatrix} 0\,1\,2 \\ 2\,1\,0 \end{pmatrix}$$

$$P_2''(B) = \begin{pmatrix} 1\,2\,0\,4\,3 \\ 0\,1\,2\,3\,4 \end{pmatrix} \quad P_2''(C) = \begin{pmatrix} 0\,1\,2 \\ 0\,1\,2 \end{pmatrix}$$

$$P_0''(E) = \begin{pmatrix} 0\,1\,2\,3\,4 \\ 4\,2\,3\,1\,0 \end{pmatrix} \quad P_3''(C) = \begin{pmatrix} 0\,1\,2 \\ 0\,2\,1 \end{pmatrix}$$

$$P_1''(E) = \begin{pmatrix} 0\,1\,2\,3\,4 \\ 1\,2\,3\,4\,0 \end{pmatrix} \quad P_4''(C) = \begin{pmatrix} 0\,1\,2 \\ 1\,0\,2 \end{pmatrix}$$

$$P_2''(E) = \begin{pmatrix} 0\,1\,2\,3\,4 \\ 3\,4\,1\,0\,2 \end{pmatrix}$$

On comparison with the original subpermutations one finds that $P_2''(B) \neq P_2''(B)$ $P_1''(E) \neq P_1(E)$, $P_2''(E) \neq P_2(E)$, $P_0''(C) \neq P_0(C)$ and $P_3''(C) \neq P_3(C)$, the other subpermutations being unchanged. In order to execute the desired interconnection of network input 0 with network output 6, and thus input 6 with output 10, reroutings have to be made in the input module IM 2, in the output modules UM 1 and UM 2 and in the center modules MM 0 and MM 3. FIG. 4 shows the network after the rerouting has been made.

An example of how the switching network of FIGS. 3–4 can be realized is illustrated in FIG. 5. The interconnections between on the one hand, the input modules and the center modules and, on the other hand, the center modules and the output modules are considered to be made in special link connecting units LK 1, LK 2 by means of fixed strappings in accordance with the connections shown in FIGS. 3–4. According to the example, each switching module has its own control unit, e.g. the control unit SI 0 belonging to the input module IM 0, which operates the switching points of the respective module. The switching modules can employ electronic relays, each control unit being equipped with driver circuits which, for instance, are controlled via decoders from a memory. The actual switching condition remains in the memory and is only changed when an operating instruction arrives at the control unit from a distribution unit FE via a bus system which connects all control units to the distribution unit. Essentially, the distribution unit contains gate circuits which transfer operating conditions in accordance with simultaneously received control information from a control equipment SU. The control equipment determines the necessary reroutings by means of information stored in a special switch memory KM in addition to information arriving from other units of the system where the switching network is included, e.g. from register units. According to the example, the information in the switch memory KM corresponds to the overall permutation at the border line C of FIGS. 3–4. FIG. 6 shows how this information can be stored in memory KM and it refers to the original switching condition according to FIG. 3 FIG. 7 shows the contents of the switch memory KM after a completed rearrangement according to an example which shall be discussed later. The switch memory comprises two main divisions IR, UR for storing information concerning interconnected inputs and outputs on addresses 0 – 14 corresponding to the numbering at the border line C in FIG. 3. Each memory division is divided into two strings IR$a$, IR$b$, and UR$a$, UR$b$, respectively, so that inputs and outputs can be recorded in accordance with the previously described internal numbering system. In this manner the memory cells of the string IR$a$ record the numbers of the input modules and UR$a$ the numbers of the output modules. In the IR$b$ cells the input numbers of the various input modules are recorded and in the UR$b$ cells the output numbers of the output modules.

FIG. 8 shows an example of how the control equipment SU can be implemented in order to execute a simple rearrangement. For the sake of clarity the Figure also shows the switch memory KM and its connection to the control equipment. The control equipment includes a read and write unit LS with the aid of which information can be read out from or written into the switch memory KM at addresses received from an address generator AG. The read out is made into two registers ZR, WR. The address generator is also connected to an associative memory AA for translation of the addresses 0 – 14 into the previously described transformed designation system. Three registers PR, RR, QR are provided for storing the transformed addresses. By means of two more associative memories IA, UA a transformation is made of the designations 0 – 14 of the network inputs and outputs which are received on the inputs I and U, respectively. There are two registers XR, YR for storing these transformed designations. By means of a selector gate VG 1 the information stored in either of the registers XR – ZR can be transferred to the input side of the read and write unit LS and also to one of the input sides of a comparator JK 1. The other input side of this comparator is connected to the outputs La, Lb from the read and write unit LS and its output is connected to a control input A of the address generator AG. In the same manner address generator AG is connected to a second comparator JK 2, the one input side of which is connected to the outputs Aa, Ab from the associative memory AA and the other input side of which is connected to a selector gate VG 2. The inputs of this gate receive information from either of the registers PR, RR. There is still another connection to the control input of the address generator, namely from an AND-gate OG which receives its input conditions from two more comparators JK 3, JK 4. In contrast to the previously mentioned comparators, these two comparators have inputs only for the first digit of the compared designations. Thus comparator JK 3 is connected to the output Pa from the register PR and the output Aa from the associative memory AA. Comparator JK 4 is connected to the output La from the read and write unit LS and the output Ya from the register YR. Two more comparators JK 5, JK 6 are provided, each with one-digit inputs. JK 5 compares the first digits Pa, Ra from the registers PR, RR and JK 6 compares the digits Ya, Za from the registers YR, ZR. The outputs from these comparators are brought together on a common line K to an input of a sequence generator SG, the purpose of which is to supply the other units of the control equipment with activating signals S in a determined sequence. A sequence is started by a connection instruction which arrives on the line KO, e.g. from a register unit and it finishes after the reception of a signal on the line K, a ready signal then being transmitted on line KK. By means of control information from the outputs M, the distribution unit FE supplies operating instructions to the control units in the switching network and then these control units execute reroutings in the respective switching modules in accordance with the information which is simultaneously transferred by unit FE from the outputs Xa, Ya, Yb, Za, Zb, Wa, Pa, Ra and Qa.

To describe the operation, a simple case is chosen, namely that the network input 0 is to be connected to the network output 9, starting from the condition described by FIGS. 3 and 6. The designation 0 arrives on line I and th designation 9 on line U, at the same time as a connection instruction arrives on line KO. See FIG. 8, the first action is to read out the transformed designations 00, 14 to the registers XR, YR in response to a control signal (S) from the sequence generator SG. The next step is to look up the corresponding addresses in the switch memory KM, where these designations are recorded. This is performed in such a way that each of the registers XR, YR in turn are through-connected by the switching gate VG 1 to one input side of the comparator JK 1, the other side of which is supplied with the designations which are read out on the lines La, Lb from the switch memory KM while the addresses generator AG runs through the address repertoire 0 – 14. As soon as the designations compare, comparator JK 1 transmits a stop signal on the line A to the address generator AG. The respective transformed addresses can then be read out on the lines Aa, Ab from the associative memory AA to the registers, PR, RR namely 00 and 02. In synchronizm with this address read out, a read out is made from the switch memory KM of the designation pertaining to the network input presently being interconnected with the network output 14, namely input 24, and the designation of the network output presently being interconnected with the network input 00, namely output 20 (see FIG. 6). These designations are written into the registers WR, ZR. By means of the circuits JK 3, JK 4, OG a search is now made for an address which shall meet two conditions. The first digit of the transformed address designation must be the same as the first digit in the register PR, i.e. Aa = Pa, and the first digit of the designation pertaining to the network output which is recorded on this address in the switch memory KM must be the same as the first digit in the register YR, i.e. La = Ya. Spelled out this means: look for that address which identifies the center module which presently interconnects network input 00 with network output 20 and further identifies that input in this center module which presently is connected to the output module which has the network output 14. In this case Pa = 0 and Ya = 1 and therefore, according to FIG. 6, the address looked for will be 2 or when transformed 02. This address is stored in register QR for possible future use. Then the output designations in the switch memory KM are shifted so that the designation 14 is written into the address 0 and the designation 20 is written into the address 2, in accordance with FIG. 7. These addresses are looked up by means of the comparator JK 2, the one side of which is supplied with the addresses which are read on the lines Aa, Ab from the memory AA and the other side of which is supplied with each of the addresses stored in the registers PR, RR, in turn, via the selector gate VG 2. The recording of the respective designations in the switch memory KM is made from the registers YR, ZR via the selector gate VG 1 and lines Sa, Sb to the read and write unit LS.

Having updated the switch memory it remains to execute the corresponding reroutings also in the switching network. As a first step, therefore, a series of four reroutings is ordered, the distribution unit FE in FIG. 5 receiving control information from the outputs M of the sequence generator SG implying that the information on the outputs Xa–Qa is to be interpreted in a certain way. Thus the first instruction is directed to the center module indicated by line Pa(= 0), Za(= 0) indicating the input, and Ya(= 1) indicating the output of the center module to be interconnected. The control units are constructed in such a way that when an operating instruction is executed in order to interconnect a certain module input $x$ with a certain module output $y$ the control unit will at the same time interconnect the input which was previously connected to output $y$ with the output which was previously interconnected with input $x$. In this case therefore the input 0 will be connected to input 1 and input 2 to output 2 in center module MM0. The second instruction concerns the center module indicated by Ra(= 0), input according to Wa(= 2), output according to Za(= 2). As this interconnection has already been executed in connection with the previous instruction no change will take place. The third instruction concerns the output module indicated by line Ya(= 1). Here the input is indicated by Pa(= 0) and the output by Yb(= 4). As can be seen from FIG. 3 they are already interconnected and therefore no change takes place. The fourth instruction, finally, is directed to the control unit of the output module indicated by the information one line Za (= 2), the module input then being indicated by line Ra(= 0) and the module output being indicated by line Zb(= 0).

However, also they are interconnected, according to FIG. 3.

In the sequence described above several of the operating instructions from the distribution unit FE have not led to any change of the routing picture which is due to the simple example that was chosen. After having executed the four operating instructions, a comparison is now made between the first digits $Pa$, $Ra$ in the two registers PR, RR by means of the comparator JK 5. Equality means that only a center stage has been involved in the rerouting process. As a consequence of this, all of the subpermutations are valid and therefore the process can be stopped. This is the case in the example where $Pa = Ra = 0$ and a signal is transmitted to the sequence generator SG on line K. If the comparison had indicated disparity the next step would have been to make a comparison between $Ya$ and $Za$ in the comparator JK 6. Equality of these two parameters would have indicated that only an output stage had been involved in the rerouting process and therefore the process could have been stopped by means of a signal on line K also in this case. Otherwise more reroutings would have been necessary, the determination of which being analogous to what has been described above and making use of the information stored in the register QR.

The apparatus described above is only an example of how the switcing network and the control equipment can be implemented. The switching network for example can also be digital, as in PCM, inputs and outputs as well as links being represented by time slots incorporated in one or more TDM-frames on a corresponding number of busses and the interconnection on such circuits being achieved by switching time slots in the respective switching stages in a manner well known in the TDM technique. Furthermore the control equipment can be realized by a computer including the functions which have been described.

I claim:

1. A switching system comprising: a plurality of input switching modules, each of said input switching modules having several input-switching-module inputs which are network inputs, several input-switching-module outputs, and input-switching-module switching control means for connecting each of said input-switching-module inputs to any one of said input-switching module outputs in response to control signals; a plurality of output switching modules, each of said output switching modules having several output-switching-module inputs, several output-switching-module outputs which are network outputs, and output-switching-module switching control means for connecting each of said output-switching-module inputs to any one of said output-switching module outputs in response to control signals; a plurality of center switching modules, each of said center switching modules having several center-switching-module inputs, several center-switching-module outputs, and center-switching-module switching control means for connecting each of said center-switching-module inputs to any one of said center-switching-module outputs in response to control signals; a first plurality of links, each link of said first plurality connecting a different one of said input-switching-module outputs to a different one of said center-switching-module inputs; a second plurality of links, each link of said second plurality connecting a different one of said center-switching-module outputs to a different one of said output-switching-module inputs; a switch memory means having a plurality of memory cells, each of said memory cells having an address related to a link in one of said pluralities of links, each of said memory cells storing a first information unit indicating which of the network inputs should be connected to the link associated with the cell address and also storing a second information unit indicating which of the network outputs should be connected to the link associated with the cell address; control signal generating means responsive to the information units stored in said memory cell for generating control signals fed to the switching control means on said switching modules to effect the connections between network inputs and network outputs as recorded in said memory cells; means for receiving information units representing a first network input and a first network output between which a connection is desired; means for locating a first memory cell storing the information unit of said first network input and for locating a second memory cell storing the information unit of the first network output; means for interchanging information units recorded in said first and second memory cells so that the information units of said first network input and said first network output go into the same memory cell; and analyzing means for determining whether the new connections established by said switching modules in response to the new information units recorded in said first and second memory cells correspond to the desired connection.

2. The system in accordance with claim 1 wherein each of said links is a pair of signal conductors interconnecting an output of one switching module to an input of another switching module.

3. The system in accordance with claim 1, wherein each of said links is constituted by a time slot which is transferred on TDM busses interconnecting adjacent switching stages.

4. The system in accordance with claim 1 wherein said control signal generating means and said analyzing means are part of a digital computer.

* * * * *